(12) United States Patent
Jiang

(10) Patent No.: US 7,707,478 B2
(45) Date of Patent: Apr. 27, 2010

(54) ERROR CORRECTION IN PACKET-BASED COMMUNICATION NETWORKS USING VALIDATION SETS

(75) Inventor: Wenyu Jiang, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1095 days.

(21) Appl. No.: 11/241,745

(22) Filed: Sep. 29, 2005

(65) Prior Publication Data

US 2007/0089036 A1    Apr. 19, 2007

(51) Int. Cl.
H03M 13/00    (2006.01)

(52) U.S. Cl. ................... 714/758; 714/776; 714/777

(58) Field of Classification Search ........... 714/758
See application file for complete search history.

(56) References Cited

U.S. PATENT DOCUMENTS 6,330,241 B1 *  12/2001  Fort ................. 370/395.1
2002/0071393 A1 *  6/2002  Musoll ................. 370/248

FOREIGN PATENT DOCUMENTS

EP    1 041 763    10/2000

WO    WO 00/69105    11/2000

OTHER PUBLICATIONS

Singer, E, Techniques for improving the robustness of an adaptive predictive coder in the presence of channel errors, 1980, IEEE, vol. 5, pp. 533.*
Morelos-Zaragoza, et al., "On a Class of Optimal Nonbinary Linear Unequal-Error-Protection Codes for Two Sets of Messages" IEEE Transactions on Information Theory. IEEE Service Center, Piscataway, NJ, US. vol. 40, No. 1, Jan. 1994, pp. 196-200.
Munir, Muhammad Farukh., "Study of an Adaptive Scheme for Voice Transmission on IP in a Wireless Networking Environment 802.11e," ESSI (Ecole Supérieure En Sciences Informatiques, Université De Nice, France, Jun. 2005.
Lam, et al., "Selective FEC for Error-Resilient Image Coding and Transmission Using Similarity Check Functions," 2004 Int'l.Conf. on Image Processing (ICIP), 0-7803-8554-3/04, 2004, IEEE, 3217-3220.

* cited by examiner

Primary Examiner—M. Mujtaba K Chaudry
Assistant Examiner—Enam Ahmed

(57) ABSTRACT

Bit errors in packets of data that are communicated in a network such as a wireless network can be corrected by processes that do not require any overhead in the data such as conventional error-detection codes or redundant information such as conventional error-correction codes. A validation-set process compares corrupted data against values in a set of known valid values and selects one of the known valid values to replace the corrupted data. A consistency-check process uses data correlation characteristics of two or more parameters to determine if values obtained from a packet are consistent with one another. If not, values are changed to make them consistent.

27 Claims, 3 Drawing Sheets

ERROR CORRECTION IN PACKET-BASED COMMUNICATION NETWORKS USING VALIDATION SETS

TECHNICAL FIELD

The present invention pertains generally to data communication and pertains more particularly to facilities that may be implemented in data communication networks to correct errors in corrupted data.

BACKGROUND ART

Packets of data that are communicated in a network such as a wireless network are often vulnerable to corruption by a variety of mechanisms including noise and competing signals that can interfere with the communication. As a result, the data arriving at a receiver may differ from the corresponding data that left the transmitter. Information such as cyclical redundancy codes may be included with the data to facilitate the detection of errors. This type of information is often referred to as error-detection codes. Various types of redundant information, often referred to as error-correction codes, may be included to facilitate the detection and correction of errors. Errors may also be corrected by a variety of communication techniques including those that allow a receiver to request the retransmission of a packet whenever an error is detected in that packet, or that obligates a transmitter to transmit a packet multiple times and allows a receiver the ability to derive corrected data from the multiple packets.

Unfortunately, these known techniques for correcting errors in received data require additional capacity to store or convey the required redundant data. What is needed is a way to correct errors that does not require additional overhead or redundant data such as error-correction codes.

DISCLOSURE OF INVENTION

It is an object of the present invention to provide for the correction of data in packet-based communication networks that does not require additional overhead or redundant data such as error-correction codes.

According to one aspect of the present invention, errors in a received packet of data are corrected by detecting an error in the data representing a specified parameter in a plurality of parameters and applying a correction process to the data representing the specified parameter to correct the error by using a set of valid parameter values for the specified parameter, wherein the correction process is independent of any error-detection code or error-correction code in the packet of data, and wherein the specified parameter is represented by data elements capable of representing N different values, the set of valid parameter values has M different values, and M is less than N.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

1. Exemplary Communications Network

Figure 1:
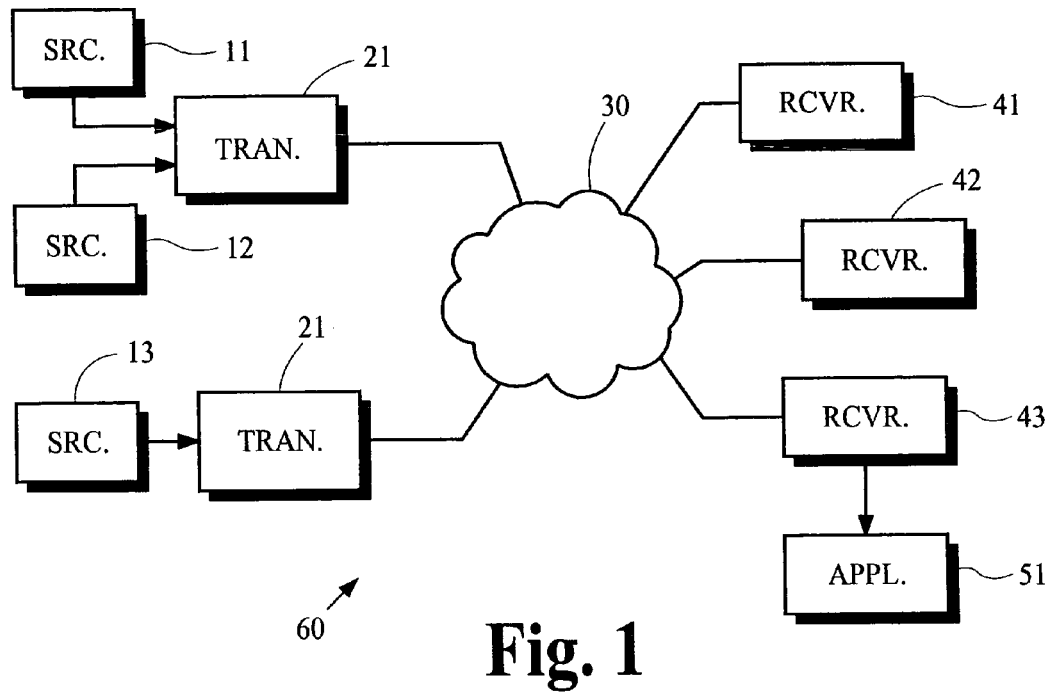
FIG. 1 is a schematic diagram of an exemplary communications network.

FIG. 1 is a schematic diagram of one example of a communication network in which various aspects of the present invention may be incorporated. The communication network 60 includes a communication medium 30 such as electrical, optical or electromagnetic communication paths and associated equipment for transmitting and receiving data via the communication paths. The communication medium 30 may conform to essentially any standard including Ethernet, which is described in the IEEE 802.3 standard, or WiFi, which is described in the IEEE 802.11 standard, using a communication protocol such as the Transmission Control Protocol/Internet Protocol (TCP/IP). No particular protocol or communication standard is critical to practice the present invention.

Referring to FIG. 1, the sources 11, 12, 13 provide digital data to one or more transmitters 21, 22, which arrange the data into packets and transmit those packets into the communication medium 30. Preferably, the transmitters 21, 22 include some type of error-detection code (EDC) in the packets such as a cyclical redundancy code (CRC) or a parity bit. The receivers 41, 42 43 receive packets from the communication medium 30 and may employ any form of conventional error detection or error correction that may be desired. Data from the packets, which may be subjected to conventional error correction techniques, can be passed to another device such as the appliance 51 to process the packet data according to the needs of some application.

For example, the source 11 may provide encoded audio data to the transmitter 21, which is an access point (AP) in a wireless network, for transmission via an electromagnetic communication medium 30 to the receiver 43. The packets of data received by the receiver 43 may be processed according to any conventional error detection and correction techniques that may be desired and subsequently passed to the appliance 51, which is an audio decoder and audio playback system. Various aspects of the invention may be implemented in the receiver 43 or in the appliance 51, for example.

B. Error Correction Techniques

Error correction may be implemented in a variety of ways including, for example, processing circuitry in a receiver within the communication network 60. According to this example, a receiver in the network such as the receiver 43 receives a packet of data representing a plurality of parameters and applies an error-correction process to data representing one or more specified parameters within the plurality parameters to correct any errors that may be present. Two error-correction processes are discussed below.

1. Set of Valid Parameter Values a) Basic Description of Process

One error-correction process, referred to as the validation-set process, corrects errors in the data representing a specified parameter by comparing the corrupted data to the values in a set of known valid values for that specified parameter and selecting one of the known valid values to replace the corrupted data.

Preferably, the validation-set process is carried out for data only if there is some indication of data corruption. Essentially any technique may be used to detect data corruption. Examples include techniques that check CRC or parity bits.

Preferably, some measure of difference between the corrupted data and the values in the set of valid parameter values is used to select a replacement value that minimizes the measure of difference. A variety of measures may be used such as the Hamming distance, which is a count of the number of differing bits between two binary numbers of the same length. Using this measure, the valid parameter value in the set with the smallest Hamming distance to the value in the corrupted data is selected as the replacement value because it is deemed to be the most likely candidate for the original uncorrupted value. If the set of valid parameter values is such that a large distance exists between each pair of the valid values, then it is less likely that a given number of bit errors can change one valid parameter value into another valid value, thereby improving the reliability of this process to correct errors.

This validation-set process requires that the number of values in the set of valid parameter values be less than the total number of values that can be expressed by the data representing the specified parameter. For example, if the packet data representing a specified parameter has K binary-valued data elements or bits, those data elements are capable of expressing $N=2^K$ different values. The number M of values in the set of valid parameter values must be less than N. Preferably, M is substantially smaller than N such as, for example, $M<\frac{1}{2} N$.

b) Obtaining the Set

The set of valid values can be obtained in a variety of ways. No particular way is critical. According to one way, a complete set of valid values is obtained from one or more packets that convey initialization information for the set. This initialization information could be generated by a digital data source 11, 12, 13 or a transmitter 21, 22 when it is powered on or initialized for operation and then broadcasted to all receivers within the communication network 60, or it could be requested by a receiver 41, 42, 43 within the network 60 when it is powered on or initialized for operation.

According to another way, all or at least some of the values in the set of valid values are obtained from data available directly to the device that performs the error-correction process. For example, all or some valid values can be recorded in persistent storage such as read only memory (ROM) with a receiver 41, 42, 43 and used by processing circuitry within the receiver to build a complete or partial set of valid parameter values when the receiver is powered on or initialized for operation.

According to yet another way, the set of valid values is constructed incrementally from information obtained from data in packets that are received without data corruption. If a CRC or other means is used to determine whether a packet is received without corruption, the data representing a specified parameter in an uncorrupted packet can be assumed to express a valid value and that value can be added to the set if it is not already in the set.

c) Example

The validation-set process described above may be used to correct errors in data representing essentially any parameter including communication control parameters and application parameters. The term "application parameters" refers to values that are used by specific applications of the packet data such as audio or multimedia decoding and playback systems. The term "communication control parameters" refers to values that are used by one or more devices in the communication network 60 to control the transmitting and receiving of packets. An example of this process that may be used to correct errors in communication control parameters conveyed in control headers of a IEEE 802.11 compliant packet is described in the following paragraphs. If desired, additional details about the information that is conveyed in this header may be obtained from IEEE 802.11-Part 11: Wireless LAN Medium Access Control (MAC) and Physical Layer (PHY) Specifications (1999).

The MAC header of an IEEE 802.11 compliant packet conveys important parameters including 48-bit identifiers of the source and the intended receiver for that packet. In some cases it also conveys an identification of the network to which the packet belongs. The valid values for these device identifiers are the network addresses of devices in the communication network. Errors in the network addresses may be corrected using a method such as the one illustrated in FIG. 2, which is described below.

Figure 2:
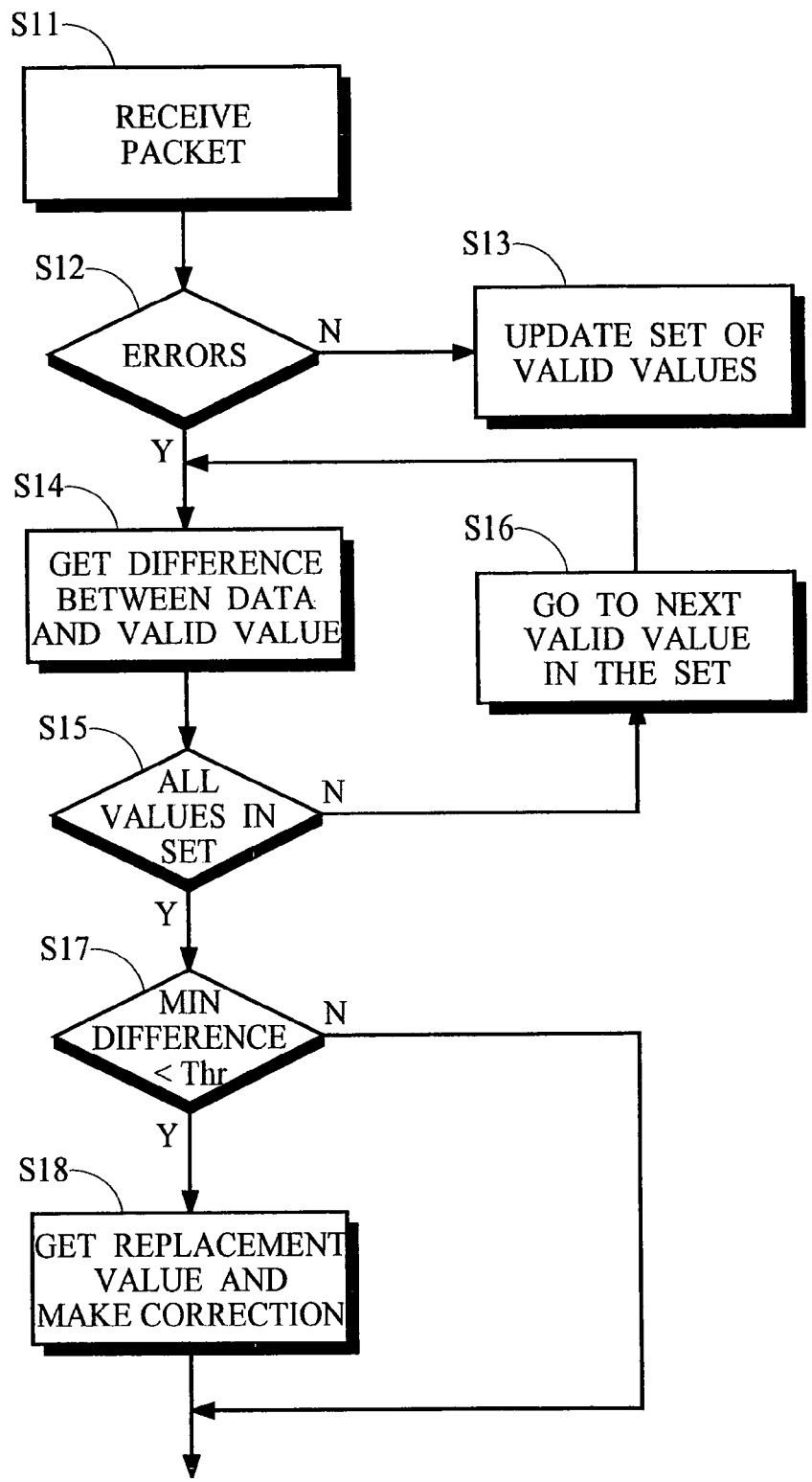
FIG. 2 is a flow diagram of a method that may be used to carry out an error-correction technique using sets of valid parameter values.

Referring to FIG. 2, step S11 receives a packet of data and step S12 checks a CRC in the packet to determine whether there is data corruption in the received packet. If no corruption is detected, step S13 extracts network addresses from the MAC header of the packet and adds each address to a list or set of valid address values if the address is not already in the set. If step S12 determines that there is data corruption, step S14 calculates a measure of difference such as the Hamming distance between the network address represented by the corrupted data and a known valid address from the set of valid address values. Step S15 determines whether a measure of difference has been calculated for all values in the set of valid address values. If the difference measure has not yet been calculated for all values, step S16 advances to the next value in the set and returns to step S14, which calculates the measure of difference for that next value. Step S15 can also check if the calculated distance is zero and, if it is zero, immediately skip steps S17 and S18 because it would be known that no correction is needed for the data representing the network address. The error detected by step S12 apparently pertains to other data in the received packet.

When step S15 determines that difference measures have been calculated for all values in the set, step S17 determines whether the smallest of all the difference measures calculated in step S14 is less than a threshold value. Empirical tests suggest a good choice for this threshold is no more than eight bits that are distributed within no more than three bytes of the address data. If the minimum difference is not less than the threshold, then the network address may belong to a different network or the amount of data corruption exceeds what can be corrected; therefore, no correction is made. If the minimum difference is less than the threshold, the corruption is corrected by selecting the value from the set of valid parameter values that corresponds to the minimum difference and using the selected value to replace the corrupted data from the packet.

The validation-set process works very well for typical networks because the network addresses of all devices in the network are sparse within the total address space. For example, an 802.11 MAC network address parameter is a 48-bit number in a total address space of $2^{48}$ unique addresses. A typical 802.11 compliant network usually has less than 100 devices; therefore, if each device's address is sufficiently different from one another in terms of the number of differing bits, the process described above should work very well.

The computational complexity of this error-correction process can be proportional to the number M of values in the set of valid parameter if the calculation of the measure of difference is constant or nearly constant for all values in the set.

2. Consistency Checks a) Basic Description of Process

Another error-correction process, referred to as the consistency-check process, uses data correlation characteristics of two or more parameters to determine if the values obtained from packet data representing the two or more parameters are consistent with one another and, if not, to change the data for a selected parameter so that the values are consistent. An error model that describes probabilities of data corruption in the packets is used to select for correction that parameter represented by data having a high probability of corruption.

Preferably, this error-correction process is carried out for data only if there is some indication of data corruption. Essentially any technique may be used to detect whether there is data corruption. Examples include techniques that check CRC or parity bits.

b) Examples

The consistency-check process may be used to correct errors in data representing two or more different parameters within the same packet (intra-packet correction) or in data representing the same or different parameters in different packets (inter-packet correction). A few examples are described below.

(1) Inter-Packet Correction

In many packet-based networks including IEEE 802.11 compliant networks, each packet has an identification parameter such as a sequence number that increments by one for each subsequent unique packet that is transmitted by a given transmitter. If the identification parameter is the same for a current packet as well as a previous packet and both packets were sent by the same transmitter, then the current packet must be a retransmission of the previous packet unless the identification parameter is corrupted for either or both packets.

In addition, if the packets have a retry parameter that indicates whether the packet is a retransmission of a previous packet, which is the case for 802.11 compliant packets, then the retry parameter in the current packet should be consistent with the results of a comparison between identification parameters of the current and previous packets. For example, an inconsistency is detected if either of the following is true: (1) the identification parameters are identical for current and previous packets and the retry parameter for the current packet indicates it is not a retransmission, or (2) the identification parameters for the current and previous packets are not the same and the retry parameter for the current packet indicates it is a retransmission. If either condition exists, either the retry parameter in the current packet or the identification parameter in either the current or previous packets has been corrupted. A correction should be made so that these three parameter values are consistent.

If the consistency check for packet sequence numbers and the retry parameter fails for IEEE 802.11 compliant packets, it is possible that either the sequence number in the previous packet was corrupted in such a way that the previous packet was supposed to have sequence number x but it was corrupted to be received as x+1, or the sequence number in the current packet was corrupted in such a way that the current packet was supposed to have sequence number x but it was corrupted to be received as x−1. In either case, the current packet could be misinterpreted as a retransmission of the previous packet. It can be shown that the probability of such errors occurring to cause the current packet to be misinterpreted as a retransmission of a previous packet is slightly less than 1.0*BER, where BER is the probability that any given bit is corrupted, assuming the mechanism that corrupts the data operates according to a random bit error model. It can be shown that this probability is significantly less if the error mechanism tends to cause bit errors in bursts.

The probability that a one-bit retry parameter is corrupted is equal to 1.0 BER; therefore, if the error-causing mechanism tends to cause random bit errors, there is little or no advantage relying on the sequence numbers to correct the retry parameter than there is to rely on the retry parameter to correct the sequence numbers. If the bit errors occur in bursts, however, corruption of a sequence number is less likely to produce a false equality between the sequence numbers of two packets and there is an advantage to rely on a comparison of the sequence numbers to correct any errors in the retry parameter. This observation is useful because empirical results have shown bit errors in practical networks tend to occur in bursts.

If the packets include an error-detection code such as a CRC, an error-correcting process could determine whether the current packet or the previous packet has been corrupted. If this additional information indicates the previous packet is not corrupted, the probability of sequence number corruption in the current packet is reduced to about 0.5*BER. Given the probability that the one-bit retry parameter is still 1.0*BER, there would be an advantage to rely on a comparison of the sequence numbers to correct any errors in the retry parameter even if the error-causing mechanism tends to cause random bit errors.

Another consistency check for retransmissions is possible for packets in many networks including packets in IEEE 802.11 compliant networks that have an error-detection code like a CRC, which is a type of hash for the packet data. An identical hash for two packets suggests with very high probability that the data for the two packets are identical. The probability approaches 1.0 as the hash becomes longer. When the error-detection codes for two packets are identical and the codes indicate there is data corruption in the first packet but there is no data corruption in the second packet, data in the second packet can be used to replace the corresponding data in the first packet.

(2) Intra-Packet Correction

In many communication protocols such as the protocol used in an IEEE 802.11 compliant network, there are one or more control parameters in a packet whose values dictate how to interpret the meaning of other parameters in the packet. One example is the Direction Flag in the IEEE 802.11 protocol that dictates how to interpret the network address parameters in a MAC header. The MAC header conveys three parameters that represent the network addresses of the digital data source, the intended destination and the access point (AP). Because of the way the MAC header is constructed, the source, destination and AP address parameters are not located at fixed locations within a packet header. Instead, the MAC header has four address fields called Address1, Address2, Address3 and Address4 that collectively convey the source, destination and AP addresses as a function of the Direction Flag value as shown in Table I. A receiver in an IEEE 802.11 compliant network uses the value of the Direction Flag to determine the proper bit location of the source, destination and AP addresses within the MAC header of a given packet.

TABLE I

| Direction Flag | | | | | |
|---|---|---|---|---|---|
| To AP | From AP | Address1 | Address2 | Address3 | Address4 |
| 0 | 0 | destination | source | AP | — |
| 0 | 1 | destination | AP | source | — |
| 1 | 0 | AP | source | destination | — |
| 1 | 1 | RA | TA | destination | source |

The Direction Flag has two bits, which indicate the mapping of device network addresses to the four address fields as shown. The first row in the table represents an ad-hoc mode that is not used in an infrastructure network, which is a typical configuration for an IEEE 802.11 compliant network where all packets must pass through an AP. The second row represents the control parameters for a packet that is being transmitted by the AP for receipt at an intended destination. The third row represents the control parameters for a packet that is being sent to an AP. The last row in the table represents a relay mode, with RA and TA representing intermediate relaying APs, which is rarely used.

If a packet is corrupted, it is possible that the corruption will introduce errors into the Direction Flag or any of the address parameters. To correct these types of errors, a consistency-check process can use the validation-set process to correct any errors in the address parameters and then derive the correct value for the Direction Flag by determining in what address field an AP network address appears. If the Direction Flag has any other value, it can be corrected by replacing it with the derived value.

Referring to Table I, it may be seen that the presence of an AP address in various combinations of the address fields implies a value for the Direction Flag as shown in Table II. If a known AP address is found only in the Address2 field, for example, it can be seen from Table I that 01 may be inferred as the correct value for the Direction Flag. If the data in the packet representing the Direction Flag parameter does not have this value, it can be corrected by replacing it with the derived value 01. The derived correction value for this situation is represented by the third row in Table II. Similarly, the Direction Flag parameter value is corrected to 00 or 10 if known AP addresses are found in only the Address3 field or in only the Address1 field, respectively, as shown in the second and fifth rows in Table II.

If known AP addresses are found in the Address2 and Address3 fields, either of two situations can exist as shown in the first and second rows of Table I if the source is an AP. Because this pattern of address can occur for either of two situations, no value for the Direction Flag should be inferred unless the ambiguity can be resolved. A resolution can be achieved by assuming the network is an infrastructure network in which the ad hoc mode is not used; therefore, 01 may be inferred as the correct value for the Direction Flag as shown in the second row of Table I. This situation is represented by the fourth row in Table II.

If known AP addresses are found in the Address1 and Address3 fields, either of two situations can exist as shown in the first and third rows of Table I if the destination is an AP. This ambiguity is resolved by assuming the network is an infrastructure network in which the ad hoc mode is not used; therefore, 10 may be inferred as the correct value for the Direction Flag as shown in the third row of Table I. This situation is represented by the sixth row in Table II.

If known AP addresses are found in the Address1 and Address2 fields, either of three situations can exist as shown in the second, third and fourth rows of Table I. This ambiguity cannot be resolved; therefore, no correct value should be inferred for the Direction Flag. This situation is represented by the seventh row of Table II.

If a known AP address is not found in any of the three address fields, then the correct value for the Direction Flag is undefined. It is possible that the packet belongs to another network and the network addresses of devices in that network are unknown. This is represented in the first row of Table II.

TABLE II

| | | | Direction Flag | |
|---|---|---|---|---|
| Address1 | Address2 | Address3 | To AP | From AP |
| — | — | — | undefined | |
| — | — | AP | 0 | 0 |
| — | AP | — | 0 | 1 |
| — | AP | AP | 0 | 1 |
| AP | — | — | 1 | 0 |
| AP | — | AP | 1 | 0 |
| AP | AP | — | undefined | |
| AP | AP | AP | undefined | |

The principles underlying this correction process can be extended to other situations where specific values or patterns of values imply the correct value of a specified parameter.

(3) Method

Figure 3:
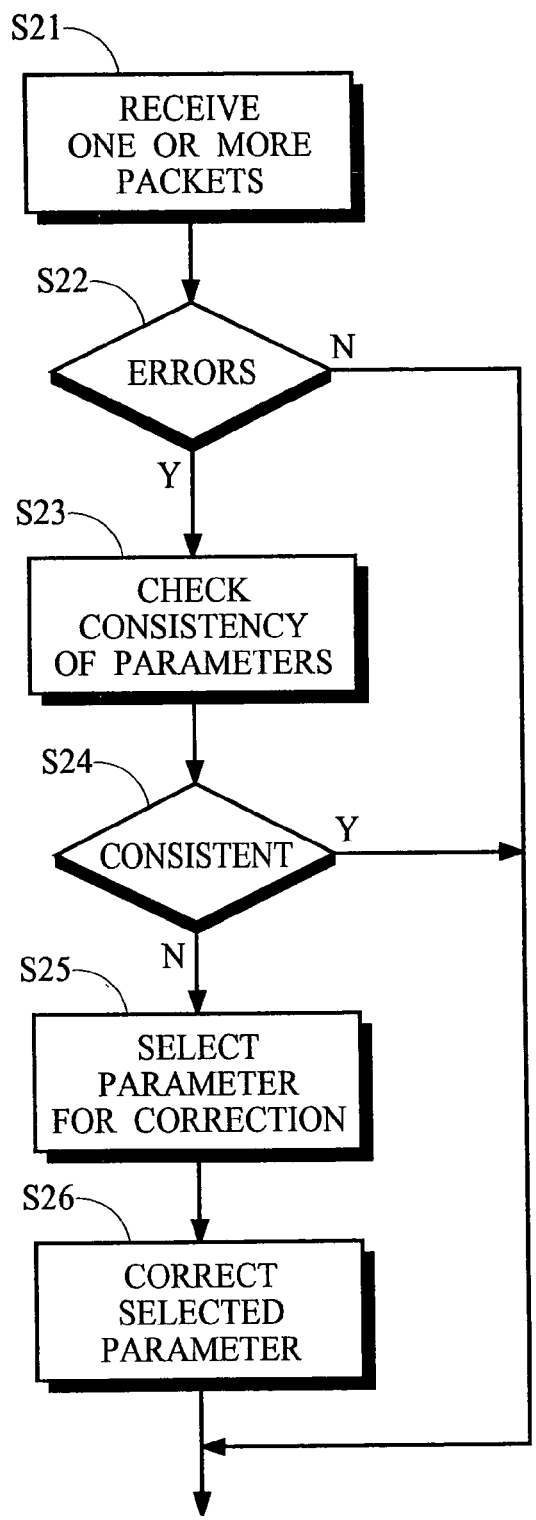
FIG. 3 is a flow diagram of a method that may be used to carry out an error-correction technique using data consistency checks.

Inter-packet and intra-packet corrections may be performed using steps in a method such as those illustrated in FIG. 3. Referring to FIG. 3, step S21 receives one or more packets of data and step S22 checks the CRC in the one or more received packets to determine whether there is data corruption. If no corruption is detected, steps S23 through S26 may be skipped. If step S22 determines that there is data corruption, step S23 performs a consistency check of the data representing two or more parameters. The consistency may be checked for data representing parameters in a single packet or in two or more packets. If step S24 determines that the checked data are consistent, steps S25 and S26 are skipped. If the data representing the selected parameters are not consistent, then step S25 uses an error model to select the parameter having a higher probability of being corrupted and step S26 modifies the data representing the selected parameter so that the data are now consistent.

C. Implementation

Figure 4:
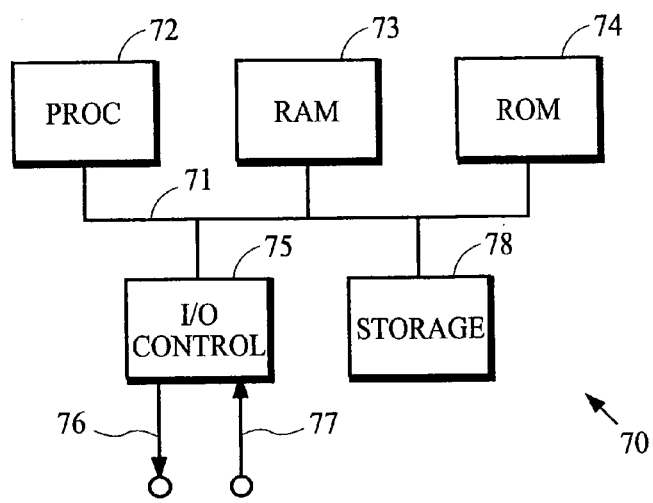
FIG. 4 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 4 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method for correcting errors in data conveyed by a communications network comprising one or more transmitters and one or more receivers, wherein the method comprises:
receiving a packet of data including data representing a plurality of parameters;
detecting an error in the data representing a specified parameter in the plurality of parameters, wherein the specified parameter is a communication control parameter or an application parameter; and
applying a correction process to the data representing the specified parameter to correct the error by using a set of valid parameter values for the specified parameter, wherein the correction process is independent of any error-correction code in the packet of data, and wherein the specified parameter is represented by data elements capable of representing N different values, the set of valid parameter values has M different values, and M is less than N.

2. The method of claim 1 that comprises constructing the set of valid parameter values from information obtained from packets of data having error detection information that indicates the packets of data were received without error.

3. The method of claim 1, wherein the data elements are binary-valued bits and M is less than ½ N.

4. The method of claim 1, wherein the specified parameter is used by one or more of the transmitters or one or more of the receivers to control transmission or receipt of the packet of data in the communications network.

5. The method of claim 4, wherein each of the transmitters and receivers in the communications network has a network address and the specified parameter is the network address of a transmitter or receiver.

6. The method of claim 1 that corrects the error by performing a process having a computational complexity that is proportional to the number M of different values in the set of valid parameter values.

7. The method of claim 1, wherein:
the packet of data includes error detection information;
the method comprises using the error detection information to determine if the packet of data has errors; and
the steps of detecting and correcting the error are performed if the packet of data has errors.

8. The method of claim 1, wherein the step of correcting the error comprises:
selecting a value from the set of valid parameter values; and
using the selected value as a replacement value for the selected parameter; wherein the replacement value minimizes a measure of difference between the data with the error that represents the selected parameter and the values in the set of valid parameter values.

9. The method of claim 8, wherein the replacement value is represented by data elements and the measure of difference is a count of the corresponding data elements that have different values in the replacement value and in the data with the error.

10. A computer-readable storage medium recording a program of instructions that is executable by a processor to perform a method for correcting errors in data conveyed by a communications network comprising one or more transmitters and one or more receivers, wherein the method comprises:
receiving a packet of data including data representing a plurality of parameters;
detecting an error in the data representing a specified parameter in the plurality of parameters, wherein the specified parameter is a communication control parameter or an application parameter; and
applying a correction process to the data representing the specified parameter to correct the error by using a set of valid parameter values for the specified parameter, wherein the correction process is independent of any error-correction code in the packet of data, and wherein the specified parameter is represented by data elements capable of representing N different values, the set of valid parameter values has M different values, and M is less than N.

11. The medium of claim 10 that comprises constructing the set of valid parameter values from information obtained from packets of data having error detection information that indicates the packets of data were received without error.

12. The medium of claim 10, wherein the data elements are binary-valued bits and M is less than ½ N.

13. The medium of claim 10, wherein the specified parameter is used by one or more of the transmitters or one or more of the receivers to control transmission or receipt of the packet of data in the communications network.

14. The medium of claim 13, wherein each of the transmitters and receivers in the communications network has a network address and the specified parameter is the network address of a transmitter or receiver.

15. The medium of claim 10 that corrects the error by performing a process having a computational complexity that is proportional to the number M of different values in the set of valid parameter values.

16. The medium of claim 10, wherein:

the packet of data includes error detection information;

the method comprises using the error detection information to determine if the packet of data has errors; and the steps of detecting and correcting the error are performed if the packet of data has errors.

17. The medium of claim 10, wherein the step of correcting the error comprises:

selecting a value from the set of valid parameter values; and using the selected value as a replacement value for the selected parameter; wherein the replacement value minimizes a measure of difference between the data with the error that represents the selected parameter and the values in the set of valid parameter values.

18. The medium of claim 17, wherein the replacement value is represented by data elements and the measure of difference is a count of the corresponding data elements that have different values in the replacement value and in the data with the error.

19. An apparatus for correcting errors in data conveyed by a communications network comprising one or more transmitters and one or more receivers, wherein the apparatus comprises:

means for receiving a packet of data including data representing a plurality of parameters;

means for detecting an error in the data representing a specified parameter in the plurality of parameters, wherein the specified parameter is a communication control parameter or an application parameter; and means for applying a correction process to the data representing the specified parameter to correct the error by using a set of valid parameter values for the specified parameter, wherein the correction process is independent of any error-correction code in the packet of data, and wherein the specified parameter is represented by data elements capable of representing N different values, the set of valid parameter values has M different values, and M is less than N.

20. The apparatus of claim 19 that comprises means for constructing the set of valid parameter values from information obtained from packets of data having error detection information that indicates the packets of data were received without error.

21. The apparatus of claim 19, wherein the data elements are binary-valued bits and M is less than ½ N.

22. The apparatus of claim 19, wherein the specified parameter is used by one or more of the transmitters or one or more of the receivers to control transmission or receipt of the packet of data in the communications network.

23. The apparatus of claim 22, wherein each of the transmitters and receivers in the communications network has a network address and the specified parameter is the network address of a transmitter or receiver.

24. The apparatus of claim 19 that corrects the error by performing a process having a computational complexity that is proportional to the number M of different values in the set of valid parameter values.

25. The apparatus of claim 19, wherein:

the packet of data includes error detection information;

the apparatus comprises means for using the error detection information to determine if the packet of data has errors; and the means for detecting and correcting the error performs its functions if the packet of data has errors.

26. The apparatus of claim 19, wherein the means for correcting the error comprises:

means for selecting a value from the set of valid parameter values; and means for using the selected value as a replacement value for the selected parameter; wherein the replacement value minimizes a measure of difference between the data with the error that represents the selected parameter and the values in the set of valid parameter values.

27. The apparatus of claim 26, wherein the replacement value is represented by data elements and the measure of difference is a count of the corresponding data elements that have different values in the replacement value and in the data with the error.

* * * * *